US009195219B2

(12) United States Patent
Hong et al.

(10) Patent No.: US 9,195,219 B2
(45) Date of Patent: Nov. 24, 2015

(54) SMART WATCH AND CONTROL METHOD THEREOF

(71) Applicant: LG ELECTRONICS INC., Seoul (KR)

(72) Inventors: Sayoon Hong, Seoul (KR); Jongho Kim, Seoul (KR); Doyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/104,937

(22) Filed: Dec. 12, 2013

(65) Prior Publication Data

US 2015/0085621 A1 Mar. 26, 2015

(30) Foreign Application Priority Data

Sep. 25, 2013 (KR) ........................ 10-2013-0113748

(51) Int. Cl.
*G06T 17/10* (2006.01)
*G04C 21/00* (2006.01)
*G04C 3/00* (2006.01)

(52) U.S. Cl.
CPC ................ *G04C 21/00* (2013.01); *G04C 3/002* (2013.01)

(58) Field of Classification Search
None
See application file for complete search history.

(56) References Cited

U.S. PATENT DOCUMENTS 6,477,117 B1 * 11/2002 Narayanaswami et al. ... 368/251
6,556,222 B1 4/2003 Narayanaswami
6,798,429 B2 9/2004 Bradski
7,519,468 B2 4/2009 Orr et al.
7,558,057 B1 * 7/2009 Naksen et al. ........... 361/679.56
2003/0085870 A1 * 5/2003 Hinckley ...................... 345/156
2005/0276164 A1 12/2005 Amron
2006/0028429 A1 * 2/2006 Kanevsky et al. ............ 345/156
2009/0009470 A1 1/2009 Choi et al.
2009/0069045 A1 3/2009 Cheng
2010/0289740 A1 11/2010 Kim et al.
2012/0235906 A1 9/2012 Ryoo et al.

FOREIGN PATENT DOCUMENTS

EP 0 666 544 A1 8/1995
JP 2005-237014 A 9/2005
KR 10-2009-0003595 A 1/2009
WO WO 2009/093027 A1 7/2009

* cited by examiner

*Primary Examiner* — Said Broome

(74) *Attorney, Agent, or Firm* — Birch, Stewart, Kolasch & Birch, LLP

(57) ABSTRACT

Discussed are a smart watch and a control method thereof. The smart watch includes a rotation sensor unit configured to sense a rotation direction and a rotation speed of the smart watch; a display unit configured to display visual information; and a processor configured to control the rotation sensor unit and the display unit and detect a first snap motion and a second snap motion of the smart watch. The first snap motion is detected when the smart watch rotates on an axis of rotation of the smart watch in a first direction at a first threshold speed or more, and the second snap motion is detected when the smart watch rotates on the axis of rotation in the first direction at less than the first threshold speed and then rotates in a second direction at a second threshold speed or more within a predetermined time.

16 Claims, 10 Drawing Sheets

FIG. 3
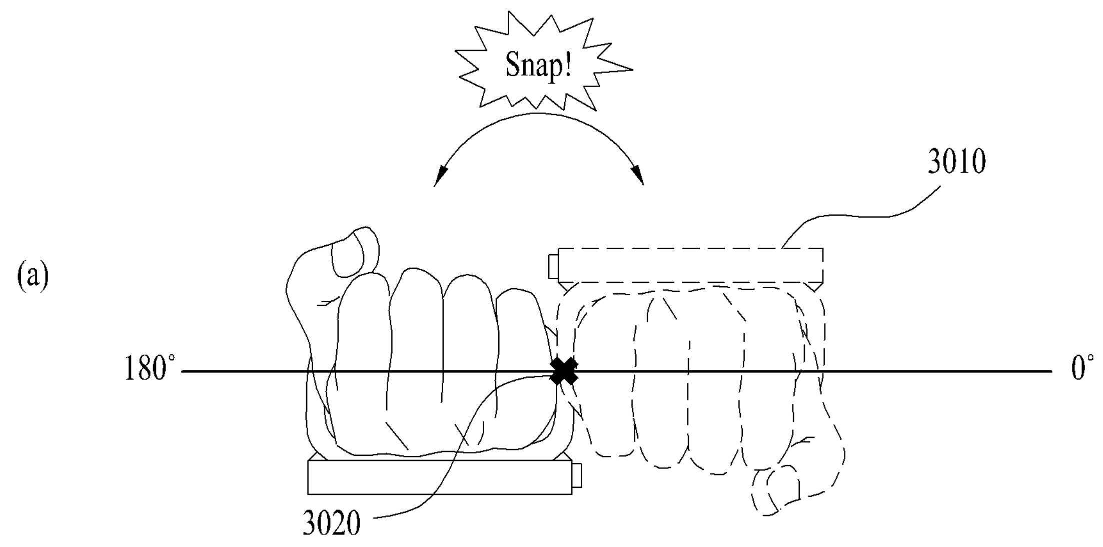
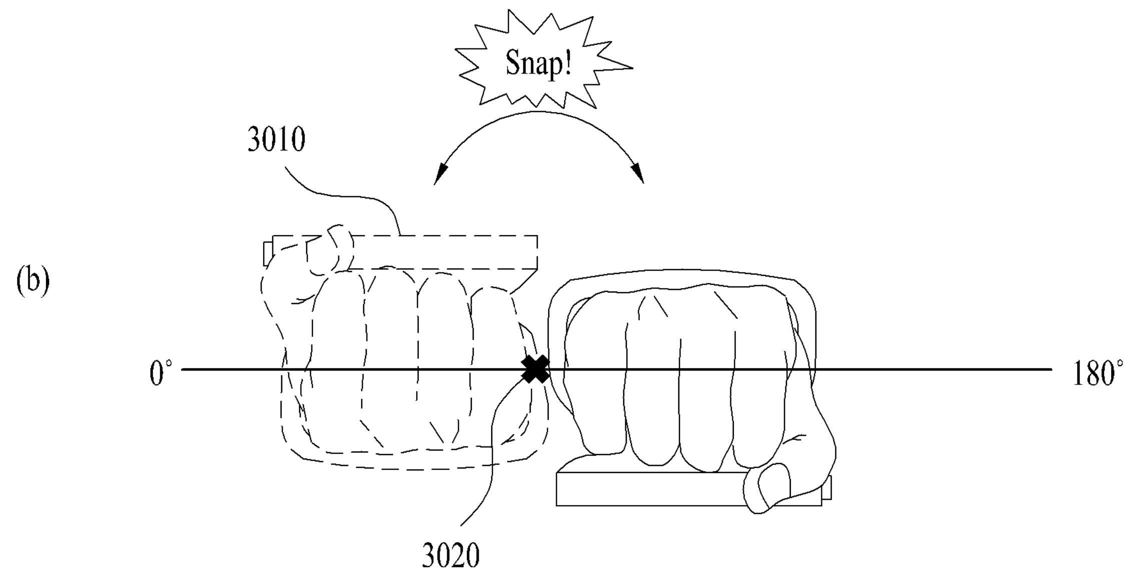

FIG. 5
(a)
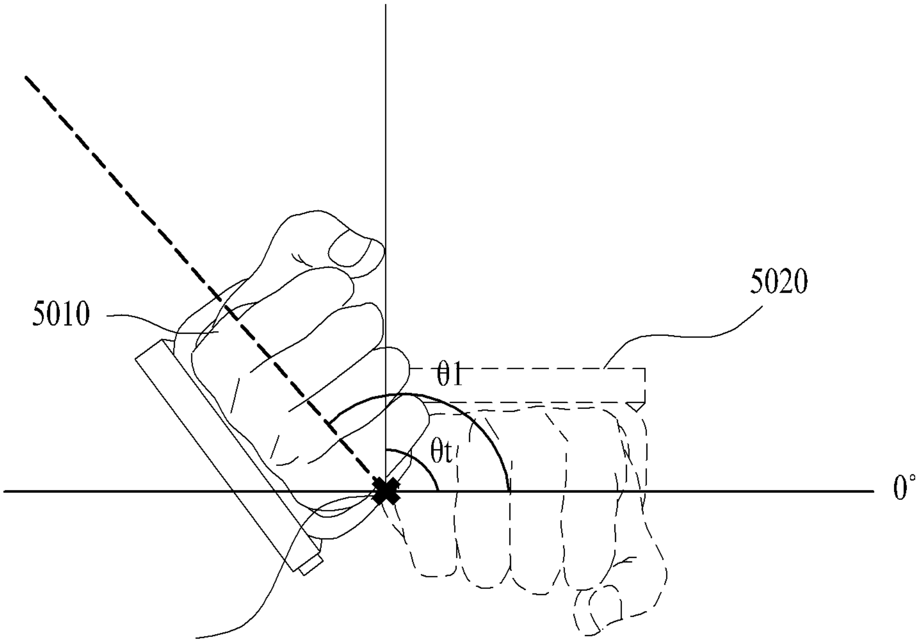
(b)
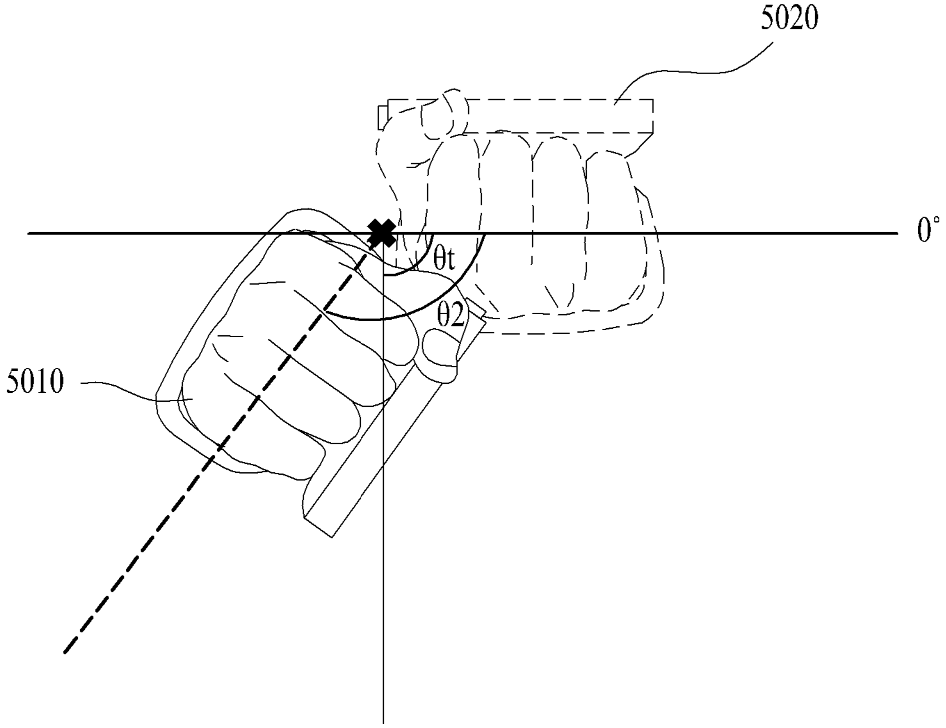

FIG. 6

| | | |
|---|---|---|
| First position | When tilt of display unit is within predetermined tilt range | First direction - outward direction<br>Second direction - inward direction |
| | When tilt of display unit is outside predetermined tilt range | First direction - inward direction<br>Second direction - outward direction |
| Second position | When tilt of display unit is within predetermined tilt range | First direction - inward direction<br>Second direction - outward direction |
| | When tilt of display unit is outside predetermined tilt range | First direction - outward direction<br>Second direction - inward direction |

SMART WATCH AND CONTROL METHOD THEREOF

This application claims the benefit of Korean Patent Application No. 10-2013-0113748, filed on Sep. 25, 2013, which is hereby incorporated by reference as if fully set forth herein.

BACKGROUND OF THE INVENTION

1. Field of the Invention

The disclosure relates to a smart watch and a control method thereof and, more particularly, to a smart watch that executes a variety of commands according to a snap motion of a wrist.

2. Discussion of the Related Art

Development of wearable computers is accelerating with advances in technologies. Wearable computers refer to computers that a user may naturally wear like clothes, watches, glasses, and accessories. Smartphones or tablet PCs may be inconvenient because a user has to put a smartphone or a tablet PC in a pocket or bag or the user has to hold the same, although the user may easily manipulate the smartphone or the tablet PC with fingers or a touch pen. On the other hand, wearable computers may achieve better portability than smartphones or tablet PCs because the user may put a smartphone or a tablet PC on his or her wrist or may wear the smartphone or the tablet PC like glasses. In particular, a variety of products related to a wrist watch, i.e. a smart watch, through which the user may search a variety of services, such as diaries, messages, notifications, and stock quotes services, in a wireless fashion has appeared as one kind of wearable computer.

Since the smart watch is put on the wrist of the user, it is possible to detect a variety of arm motions of the user. At this time, a variety of commands may correspond to the detected motions such that the user can more easily control the smart watch. In particular, a variety of commands may correspond to a snap motion of the user such that the user can more easily control the smart watch through a simple snap motion. In conventional smart watches, however, a threshold speed necessary to accurately detect the snap motion of the user was not clearly set. For this reason, the snap motion of the smart watch may not be accurately detected with the result that the smart watch may malfunction.

SUMMARY OF THE INVENTION

Accordingly, embodiments are directed to a smart watch and a control method thereof that substantially obviate one or more problems due to limitations and disadvantages of the related art.

One embodiment provides a smart watch that executes a predetermined command according to a snap motion of the smart watch.

Another embodiment provides a smart watch that determines a snap direction, based on which a snap motion is detected, according to a position of the smart watch.

Another embodiment provides a smart watch that executes a corresponding command according to a snap motion of the smart watch.

A further embodiment provides a smart watch that determines a command according to an application being currently executed or displayed Additional advantages, objects, and features of the embodiments will be set forth in part in the description which follows and in part will become apparent to those having ordinary skill in the art upon examination of the following or may be learned from practice of the embodiments. The objectives and other advantages of the embodiments may be realized and attained by the structure particularly pointed out in the written description and claims hereof as well as the appended drawings.

To achieve these objects and other advantages and in accordance with the purpose of the embodiments, as embodied and broadly described herein, A smart watch includes a rotation sensor unit configured to sense a rotation direction and a rotation speed of the smart watch; a display unit configured to display visual information; and a processor configured to control the rotation sensor unit and the display unit, wherein the processor is further configured to: detect a first snap motion and a second snap motion of the smart watch, wherein the first snap motion is detected when the smart watch rotates on an axis of rotation of the smart watch in a first direction at a first threshold speed or more, and wherein the second snap motion is detected when the smart watch rotates on the axis of rotation in the first direction at less than the first threshold speed and then rotates in a second direction at a second threshold speed or more within a predetermined time, the second direction being an opposite to the first direction, and execute a first command corresponding to the first direction when detecting the first snap motion or execute a second command corresponding to the second direction when detecting the second snap motion.

It is to be understood that both the foregoing general description and the following detailed description of the embodiments are exemplary and explanatory and are intended to provide further explanation of the embodiments as claimed.

BRIEF DESCRIPTION OF THE DRAWINGS

The accompanying drawings, which are included to provide a further understanding of the disclosure and are incorporated in and constitute a part of this application, illustrate embodiment(s) and together with the description serve to explain the principle of the disclosure. In the drawings:

FIG. 3 is a view showing an embodiment of positions of a smart watch;

FIG. 5 is a view showing a smart watch rotating on an axis of rotation thereof according to one embodiment;

FIG. 6 is a table showing a first direction and a second direction based on positions of a smart watch;

DETAILED DESCRIPTION OF THE INVENTION

Although the terms used in the following description are selected, as much as possible, from general terms that are widely used at present while taking into consideration the functions obtained in accordance with the embodiments, these terms may be replaced by other terms based on intentions of those skilled in the art, customs, emergence of new technologies, or the like. In addition, in a particular case, terms that are arbitrarily selected by the applicant may be used. In this case, the meanings of these terms may be described in corresponding parts of the disclosure. Accordingly, it should be noted that the terms used herein should be construed based on practical meanings thereof and the whole content of this specification, rather than being simply construed based on names of the terms.

Moreover, although the embodiments will be described herein in detail with reference to the accompanying drawings and content described in the accompanying drawings, it should be understood that the disclosure is not limited to or restricted by the embodiments.

Figure 1:
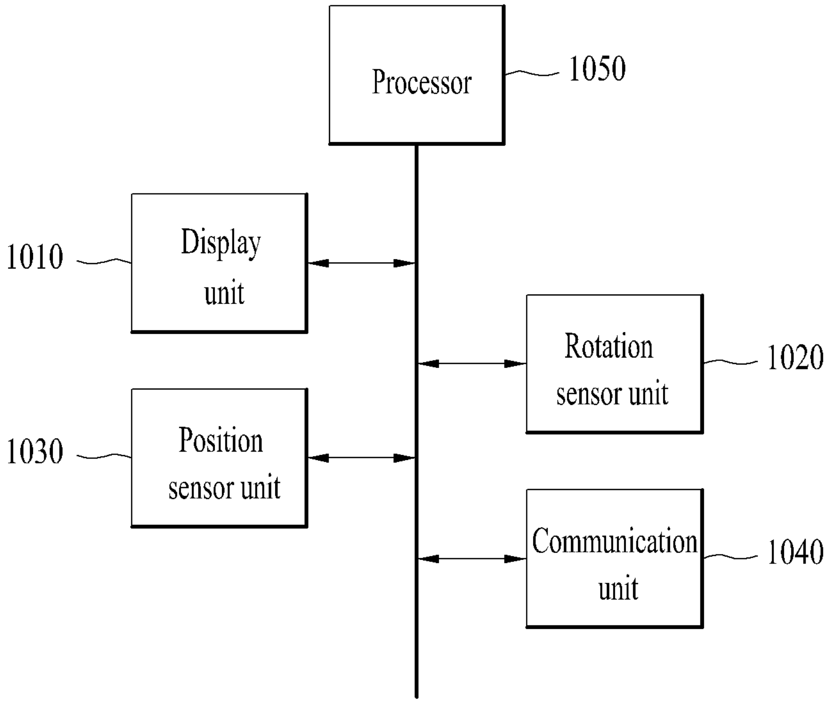
FIG. 1 is a block diagram of a smart watch of the disclosure.

FIG. 1 is a block diagram of a smart watch of the disclosure. In the disclosure, the smart watch may include a display unit 1010, a rotation sensor unit 1020, a position sensor unit 1030, a communication unit 1040, and a processor 1050.

The display unit 1010 may display visual information on a display screen. The visual information may be visibly recognizable information. Consequently, the visual information may include various kinds of videos, images, photographs, and text which may be visibly recognizable. In addition, the display unit 1010 may display various kinds of visual information based on an application or content executed by the processor 1050 or a control command of the processor 1050.

The display unit 1010 may include an inflexible display panel and/or a flexible display panel. In a case in which the display unit 1010 includes a flexible display panel, an area visual information is displayed may be controlled based on a tilt of the smart watch, which will hereinafter be described in more detail with reference to FIG. 7.

The rotation sensor unit 1020 may sense a rotation direction and a rotation speed of the smart watch. More specifically, the rotation sensor unit 1020 may sense a rotation direction and a rotation speed of the smart watch using at least one rotation sensing means included in the smart watch and may transmit a sensing result to the processor 1050. In an embodiment, the rotation sensing means may include at least one selected from among a gravity sensor, a camera sensor, a geomagnetism sensor, a gyro sensor, an acceleration sensor, a tilt sensor, an altitude sensor, a depth sensor, a pressure sensor, a gyroscope sensor, a proximity sensor, a rotation speed sensor, a stroboscope sensor, a magnetic pickup sensor, a taco generator sensor, an angular speed sensor, and a global positioning system (GPS) sensor. However, the rotation sensing means is not limited to the above embodiment. The rotation sensor means may include all sensors that may be used to sense a rotation direction and a rotation speed of the smart watch.

The position sensor unit 1030 may sense positions of the smart watch. In other words, the position sensor unit 1030 may sense positions of the smart watch put on a wrist of a user using at least one position sensing means included in the smart watch. In an embodiment, the position sensing means may include at least one selected from among a gravity sensor, a vibration sensor, a camera sensor, a tilt sensor, an altitude sensor, and a touch sensor. However, the position sensing means is not limited to the above embodiment. The position sensor means may include all sensors that may be used to sense positions of the smart watch. In addition, the position sensor unit 1030 may transmit a sensing result to the processor 1050. Position sensing of the position sensor unit 1030 will hereinafter be described in more detail with reference to FIGS. 3 and 5. Meanwhile, the position sensor unit 1030 may be selectively included in the smart watch according to embodiments.

The communication unit 1040 may communicate with an external device using a variety of protocols and may transmit and receive data to and from the external device. In addition, the communication unit 1040 may access a network in a wired or wireless fashion to transmit and receive digital data, such as content and images, to and from the network. Particularly, in the disclosure, the processor 1050 may perform pairing with the external device using the communication unit 1040. The paired external device may be controlled according to a snap motion of the smart watch.

The processor 1050 may process data in the device to execute a variety of applications. The processor 1050 may control the respective units of the smart watch as described above and may control data transmission and reception between the respective units of the smart watch.

In the disclosure, the processor 1050 may detect a snap motion of the smart watch using the rotation sensor unit 1020. More specifically, the processor 1050 may acquire a rotation direction and a rotation speed of the smart watch using the rotation sensor unit 1020 and may determine whether the acquired rotation direction and rotation speed of the smart watch are a predetermined rotation direction and rotation speed of the smart watch to detect a snap motion of the smart watch. The snap motion of the smart watch will hereinafter be described in more detail with reference to FIG. 4.

When detecting the snap motion of the smart watch, the processor 1050 may execute a predetermined command according to the detected snap motion of the smart watch. Specifically, the processor 1050 may execute a command corresponding to a rotation direction of the snap motion. The command may include an audio control command, a video control command, a scroll control command, an icon movement control command, an execution control command, and a zoom in and out control command.

In addition, the processor 1050 may determine a rotation direction, when the predetermined snap motion is detected, according to the positions of the smart watch detected using the position sensor unit 1030. The rotation direction may be an outward direction or an inward direction. More details thereof will hereinafter be described with reference to FIGS. 3 and 4.

Meanwhile, although not shown in FIG. 1, the smart watch of the disclosure may selectively include a power unit and an audio input and output unit.

The power unit (not shown) may be a power source connected to a battery in the smart watch or to an external power supply. The power unit (not shown) may supply power to the smart watch.

The audio input and output unit (not shown) may include an audio output means, such as a speaker and an earphone. The audio input and output unit (not shown) may output a voice based on content executed by the processor 1050 or a control command of the processor 1050. Particularly, in the disclosure, in a case in which an event is generated in the smart watch, the audio input and output unit (not shown) may provide a voice notification regarding the generated event.

In the following description, in a case in which each step or operation performed by the smart watch is initiated or advanced by sensing of a snap motion, a procedure of generating a signal according to the sensed snap motion and receiving the generated signal will be regarded as being described although such a procedure is not repeatedly described. In addition, the processor 1050 may be expressed as controlling the device or at least one unit included in the device according to the snap motion. Furthermore, in the following description, the processor 1050 and the device may be regarded as one and the same thing.

Meanwhile, FIG. 1 is a block diagram showing one embodiment of the disclosure and separate blocks logically classify elements of the smart watch. Thus, the aforementioned elements of the smart watch may be mounted in the smart watch as a single chip or a plurality of chips based on design of the smart watch.

Figure 2:
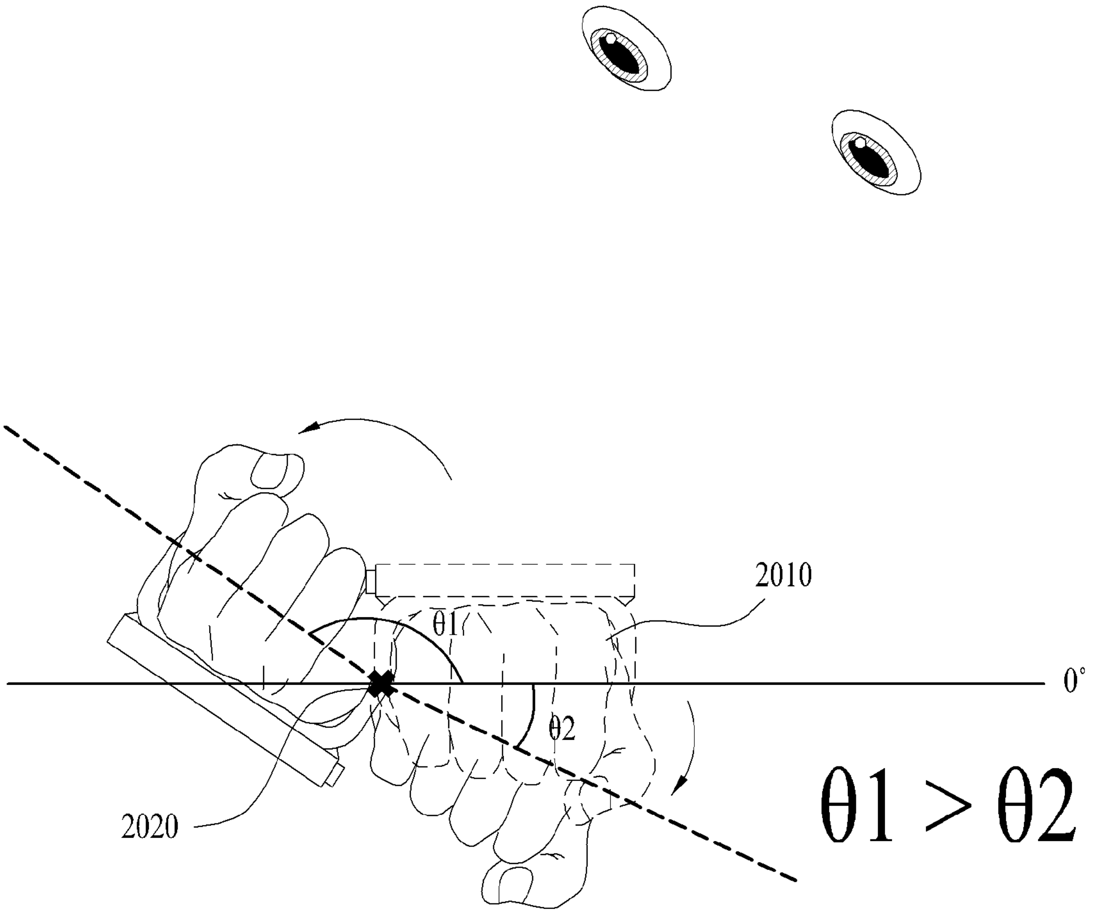
FIG. 2 is a view showing a smart watch rotating on an axis of rotation thereof according to one embodiment.

FIG. 2 is a view showing a smart watch rotating on an axis of rotation thereof according to one embodiment. More specifically, FIG. 2 shows rotation of a wrist 2010 on which the smart watch is put when viewed from front.

The smart watch of the disclosure may detect a snap motion of a user and execute a command according to the detected snap motion. The snap motion may be a wrist 2010 rotation gesture of the user rotating on an axis of rotation 2020 of the smart watch in a predetermined rotation direction and at a predetermined rotation speed. Particularly, in the disclosure, the snap motion may be a gesture of rotating the wrist 2010 as if the user snapped or flipped the display unit of the smart watch. The snap motion may be classified as an outward snap motion or an inward snap motion. The smart watch may detect an outward snap motion or an inward snap motion and may execute a predetermined command corresponding to the detected snap motion.

The smart watch may detect the outward snap motion or an inward snap motion in different manners. That is, a method of the smart watch detecting the outward snap motion may be different from a method of the smart watch detecting the inward snap motion. For example, the smart watch may detect a motion rotating outward at a first threshold speed or more as an outward snap motion. On the other hand, the smart watch may detect a motion rotating outward at less than the first threshold speed and then rotating inward at a second threshold speed or more within a predetermined time as an inward snap motion.

This is because the wrist 2010 of the user can rotate within a predetermined angle range according to structural characteristics of an arm of a human. Consequently, a rotation angle of the wrist 2010 of the user that can rotate outward or inward to the maximum may be changed depending upon positions of the wrist 2010 of the user. For example, in a case in which a back side of a hand of the user is positioned so as to be directed above as shown in FIG. 2, an outward rotation angle of the wrist 2010 may be greater than an inward rotation angle of the wrist 2010. At this time, the user may have more difficulty in making an inward snap motion than in making an outward snap motion. This is because a sufficient rotation angle is not secured in case of an inward rotation. In a case in which the user wishes to make an inward snap motion, therefore, the user may unintentionally rotate the wrist 2010 outward to secure a sufficient rotation angle and may then rotate the wrist 2010 inward to make an inward snap motion. Alternatively, in order to strongly snap the wrist 2010, the user may rotate the wrist 2010 outward and then rotate the wrist 2010 inward as an inward snap motion.

In consideration of the above description, in a case in which the smart watch detects a snap motion in a direction in which a sufficient rotation angle is not secured, it can be seen that it is possible to more accurately detect the snap motion through further sensing rotation in an opposite direction. In a case in which the smart watch of the disclosure detects a snap motion in a direction in which a rotation angle is relatively small, therefore, it is possible for the smart watch to more accurately detect the snap motion through further sensing rotation in an opposite direction. Consequently, it is possible to prevent malfunction of the smart watch due to unintentional movement or rotation of the arm of the user. Hereinafter, a rotation direction in which a maximum rotation angle is relatively large will be referred to as a first direction and a rotation direction in which the maximum rotation angle is relatively small will be referred to as a second direction for the convenience of description. The first direction and the second direction may opposite to each other.

FIG. 3 is a view showing an embodiment of positions of a smart watch.

In one embodiment, the smart watch may detect positions of the smart watch. Specifically, the smart watch may detect positions of the smart watch based on positions of a display unit 3010 included in the smart watch. As shown in FIG. 3(*a*), the smart watch may detect a position in which the display unit 3010 is put on a plane identical to or parallel to a back side of a hand of a user as a first position. On the other hand, as shown in FIG. 3(*b*), the smart watch may detect a position in which the display unit 3010 is put on a plane identical to or parallel to a palm side of the hand of the user as a second position.

The positions of the smart watch are detected to detect current positions of the wrist of the user. However, the first direction and the second direction may be changed depending upon the current positions of the wrist of the user. For example, in a case in which the smart watch is at the first position, the first direction may be an outward direction and the second direction may be an inward direction. In other words, in a case in which the smart watch is at the first position, a direction in which a maximum rotation angle is relatively large may be an outward direction and a direction in which the maximum rotation angle is relatively small may be an inward direction. On the other hand, in a case in which the smart watch is at the second position, the first direction may be an inward direction and the second direction may be an outward direction. In other words, in a case in which the smart watch is at the second position, a direction in which a maximum rotation angle is relatively large may be an inward direction and a direction in which the maximum rotation angle is relatively small may be an outward direction. These result from structural characteristics of an arm of a human as previously described.

When the first direction and the second direction are determined as described above, the smart watch may detect a snap motion rotating on an axis of rotation 3020 in each direction. In particular, a snap motion in the second direction may be detected through further sensing of rotation in the first direction as previously described.

Meanwhile, the smart watch may detect positions of the smart watch in a variety of manners. More specifically, in various embodiments, the smart watch may detect positions of the smart watch using the position sensor unit. In one embodiment, the smart watch may analyze a vibration pattern of the smart watch to detect positions of the smart watch. Vibration transmitted to the smart watch in a case in which the display unit 3010 is put on the back side of the hand of the user may be different from vibration transmitted to the smart watch in a case in which the display unit 3010 is put on the palm side of the hand of the user. The smart watch may analyze a pattern of vibration transmitted to the smart watch using a vibration sensor as the position sensor unit to detect positions of the smart watch. In another embodiment, the smart watch may analyze a photographed image to detect positions of the smart watch. The smart watch may analyze a photographed image using a camera sensor as the position sensor unit to detect positions of the smart watch. In addition, the smart watch may detect current positions of the smart watch using various sensing means, such as a blood flow sensor, a muscle sensor, a GPS sensor, a gyroscope sensor, and an acceleration sensor, as the position sensor unit. Consequently, the disclosure is not limited to the above embodiments.

Figure 4A:
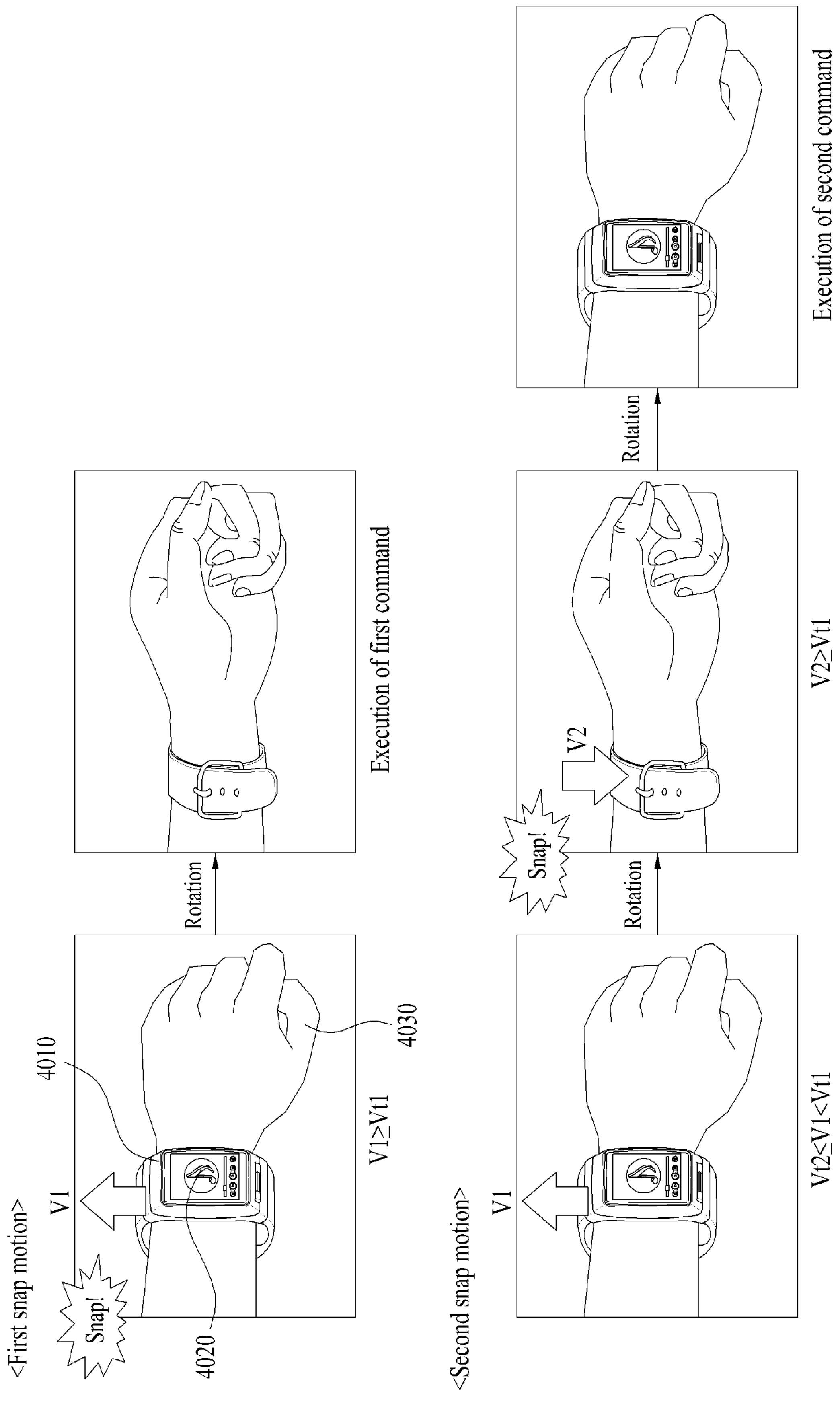
FIGS. 4A and 4B (referred to as FIG. 4) are views showing an embodiment of a smart watch that executes a command according to a predetermined snap motion.
Figure 4B:
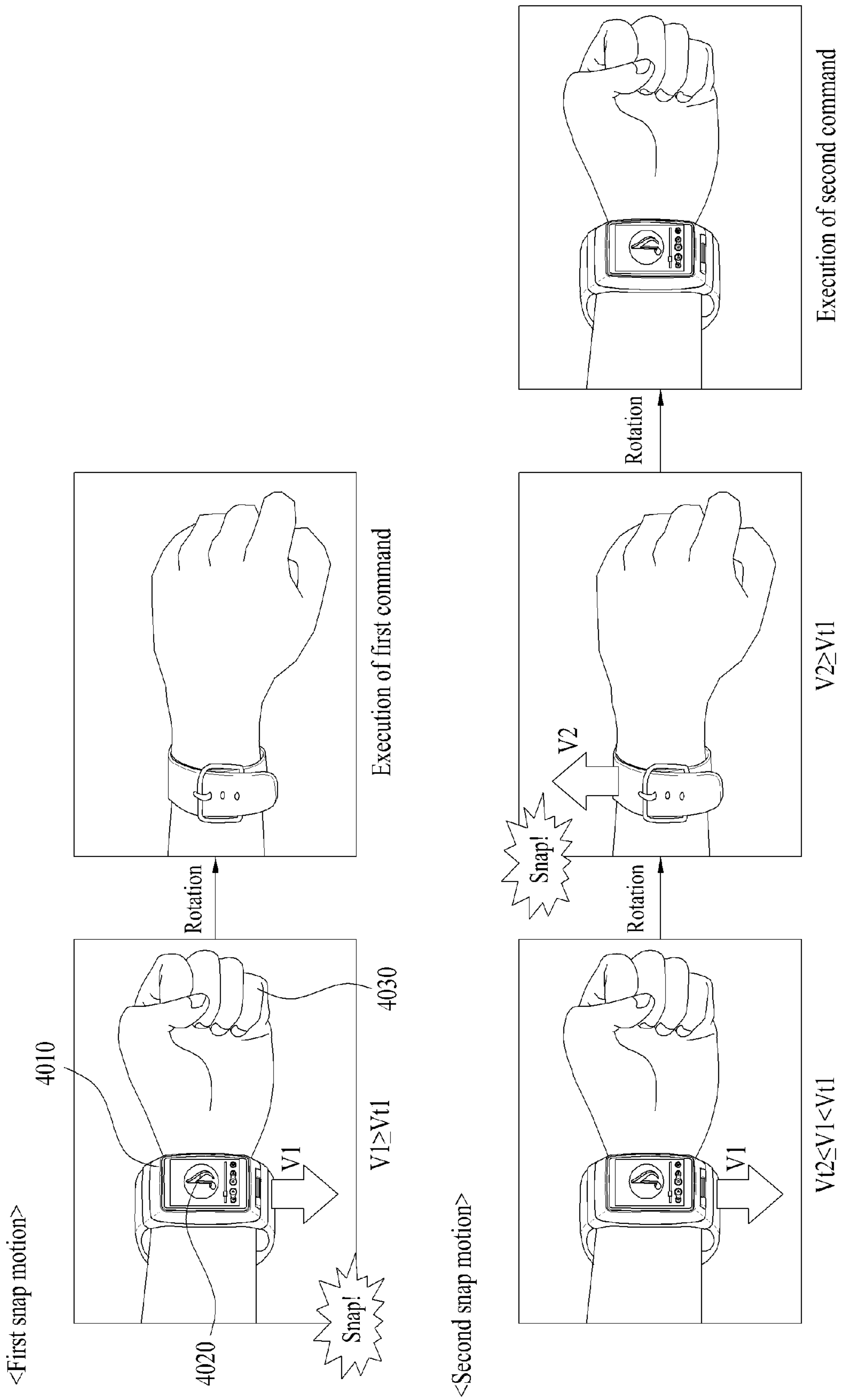

FIG. 4 is a view showing an embodiment of a smart watch that executes a command according to a predetermined snap motion. Specifically, FIG. 4A is a view showing an embodiment of a smart watch 4010 that executes a command according to a predetermined snap motion in a case in which the smart watch 4010 is at a first position and FIG. 4B is a view showing the embodiment of the smart watch 4010 that executes the command according to the predetermined snap motion in a case in which the smart watch 4010 is at a second position.

As previously described with reference to FIG. 2, the smart watch 4010 of the disclosure may detect a snap motion in the first direction (hereinafter, referred to as a first snap motion) and a snap motion in the second direction (hereinafter, referred to as a second snap motion) in different manners. At this time, the first direction and the second direction may correspond to an outward direction and an inward direction, respectively. The smart watch 4010 may detect a snap motion rotating in the first direction at a first threshold speed or more as the first snap motion. On the other hand, the smart watch 4010 may detect a snap motion rotating in the first direction at less than the first threshold speed and then rotating in the second direction at a second threshold speed or more within a predetermined time as the second snap motion. The first threshold speed and the second threshold speed may be the same or different from each other. The threshold speeds may be set based on design of the smart watch 4010 or kind and purpose of an application being executed by the smart watch 4010 or by a user.

According to embodiments, the smart watch 4010 may further detect current positions of the smart watch 4010 to more accurately detect the snap motion. The smart watch 4010 may determine the first direction and the second direction based on the detected positions to detect the first snap motion and the second snap motion. A method of detecting positions of the smart watch 4010 is identical to what was previously described with reference to FIG. 3.

More specifically, in one embodiment, in a case in which the smart watch 4010 is at the first position, the first direction may be an outward direction and the second direction may be an inward direction. Consequently, the smart watch 4010 may detect a motion rotating outward at the first threshold speed or more as the first snap motion. On the other hand, the smart watch 4010 may detect a motion rotating outward at less than the first threshold speed and then rotating inward at the second threshold speed or more within the predetermined time as the second snap motion.

In another embodiment, in a case in which the smart watch 4010 is at the second position, the first direction may be an inward direction and the second direction may be an outward direction. Consequently, the smart watch 4010 may detect a motion rotating inward at the first threshold speed or more as the first snap motion. On the other hand, the smart watch 4010 may detect a motion rotating inward at less than the first threshold speed and then rotating outward at the second threshold speed or more within the predetermined time as the second snap motion.

In a case in which the second snap motion is detected, the smart watch 4010 may further set a third threshold speed to detect the second snap motion. That is, the smart watch 4010 may detect a motion rotating in the first direction at less than the first threshold speed and at the third threshold speed or more and then rotating in the second direction at the second threshold speed or more within the predetermined time as the second snap motion. This is because it is possible to more accurately detect the second snap motion involving user intention through setting of an additional threshold speed.

The third threshold speed may be determined based on the first threshold speed or the second threshold speed. That is, the third threshold speed may be determined as a value relative to the first threshold speed or the second threshold speed. For example, the third threshold speed may be determined as a value different from the first threshold speed by 20 rad/s. In a case in which the first threshold speed is 50 rad/s, therefore, the third threshold speed may be 30 rad/s. In addition, the threshold speeds may have various values based on design and purpose of the smart watch 4010 or user setting.

When the first snap motion or the second snap motion is detected, the smart watch 4010 may execute a command corresponding to each snap direction. In other words, in a case in which the first snap motion is detected, the smart watch 4010 may execute a command corresponding to the first direction (hereinafter, referred to as a first command). On the other hand, in a case in which the second snap motion is detected, the smart watch 4010 may execute a command corresponding to the second direction (hereinafter, referred to as a second command). The first command and the second command may correspond with each other. For example, in a case in which the first command is a volume up command, the second command may be a volume down command.

The first command and the second command may correspond to at least one among an audio control command, a video control command, a scroll control command, an icon movement control command, an execution control command, an external device control command, and a zoom in and out control command. In one embodiment, kind of the first command and the second command may be determined based on kind of an application being currently executed or an execution screen of an application being currently displayed. For example, in a case in which the application being currently executed is a music reproduction application 4020, the first command and the second command may correspond to the audio control command.

In another embodiment, kind of the first command and the second command may be determined based on kind of a currently generated event. For example, in a case in which an incoming call event is generated in the smart watch 4010, the first command and the second command may correspond to an incoming call answering command or an incoming call refusing command, respectively. In a case in which a notification regarding the event generated in the smart watch 4010 is provided, the smart watch 4010 may execute a command corresponding to the notification according to the detected snap motion within a predetermined time after the notification has been provided.

FIG. 5 is a view showing a smart watch rotating on an axis of rotation thereof according to one embodiment.

In one embodiment, the smart watch may detect tilts $\theta 1$ and $\theta 2$ of a display unit 5020 to determine a first direction and a second direction in addition to the positions of the smart watch previously described with reference to FIG. 3. More specifically, the smart watch may detect the positions of the smart watch and the tilts $\theta 1$ and $\theta 2$ of the display unit 5020 to determine the first direction and the second direction.

As previously described, a wrist 5010 of a human can rotate within a predetermined angle range. On the assumption that, when a back side of a hand of the human is parallel to the ground, the wrist 5010 of the human is at an angle of 0 degrees, the wrist 5010 of the human can rotated by about 180 degrees although there are differences among individuals. Consequently, the first position and the second position may be changed depending upon current tilts $\theta 1$ and $\theta 2$ of the wrist 5010. For example, in a case in which the angle $\theta 1$ defined between the back side of the hand of the human and the ground is 45 degrees in a state in which the smart watch is currently at the first position, the first direction may be an outward direction and the second direction may be an inward direction. On the other hand, in a case in which the angle θ1 defined between the back side of the hand of the human and the ground is 135 degrees, the first direction may be an inward direction and the second direction may be an outward direction. As previously described, the first direction may be a rotation direction in which a maximum rotation angle is relatively large and the second direction may be a rotation direction in which the maximum rotation angle is relatively small.

As described above, the first position and the second position may be changed depending upon current tilts θ1 and θ2 of the wrist 5010. Consequently, the smart watch may not only detect the positions of the smart watch but also further detect the tilts θ1 and θ2 of the display unit 5020 at each position to determine the first direction and the second direction.

For example, in a case in which the smart watch is at the first position and the front tilt θ1 of the display unit 5020 is within a predetermined tilt range θt, the first direction may be an outward direction and the second direction may be an inward direction. On the other hand, in a case in which the smart watch is at the first position and the front tilt θ1 of the display unit 5020 is outside the predetermined tilt range θt, the first direction may be an inward direction and the second direction may be an outward direction.

In another example, in a case in which the smart watch is at the second position and the front tilt θ2 of the display unit 5020 is within the predetermined tilt range θt, the first direction may be an inward direction and the second direction may be an outward direction. On the other hand, in a case in which the smart watch is at the second position and the front tilt θ2 of the display unit 5020 is outside the predetermined tilt range θt, the first direction may be an outward direction and the second direction may be an inward direction.

On the assumption that, when the front of the display unit 5020 is parallel to the ground, the front of the display unit 5020 is at an angle of 0 degrees, the predetermined tilt range θt may be a range between 0 degrees and 90 degrees, which is, however, merely one embodiment. The predetermined tilt range θt may be variously set based on design or purpose of the smart watch or by a user.

Meanwhile, the smart watch may detect the front tilts θ1 and θ2 of the display unit 5020 using a rotation sensor unit. The rotation sensing unit may include at least one selected from among a camera sensor, a gravity sensor, a geomagnetism sensor, a gyro sensor, an acceleration sensor, a tilt sensor, an altitude sensor, a depth sensor, a pressure sensor, a gyroscope sensor, a proximity sensor, a rotation speed sensor, a stroboscope sensor, a magnetic pickup sensor, a taco generator sensor, an angular speed sensor, and a GPS sensor. In a case in which the front tilts θ1 and θ2 of the display unit 5020 are sensed using the camera sensor as the rotation sensing unit, the smart watch may detect a user image from an image acquired by the camera sensor to acquire the tilts θ1 and θ2 of the display unit 5020. The user image may contain a face image and/or gaze image of the user.

FIG. 6 is a table showing a first direction and a second direction based on positions of a smart watch.

FIG. 6 is a table showing the details previously described with reference to FIG. 5. As previously described with reference to FIG. 5, the smart watch may further detect the positions of the smart watch and the tilts of the display unit. In addition, the smart watch may determine the first direction and the second direction based on the detection result. The details related to the table of FIG. 6 were previously described with reference to FIG. 5 and thus a detailed description thereof will be omitted.

Figure 7:
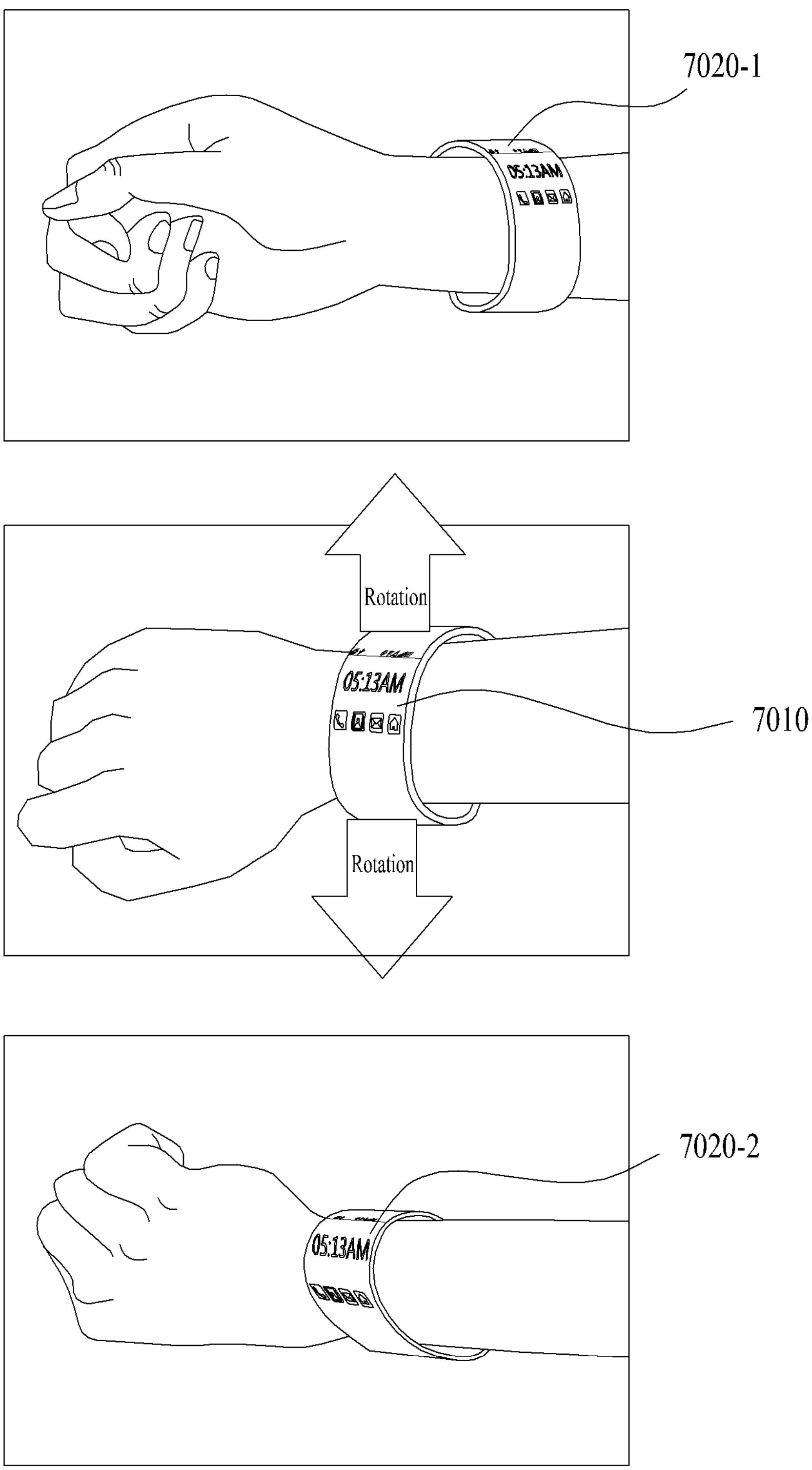
FIG. 7 is a view showing an embodiment of a smart watch including a flexible display panel.

FIG. 7 is a view showing an embodiment of a smart watch including a flexible display panel.

In one embodiment, a smart watch 7010 may include a flexible display panel. More specifically, a display unit of the smart watch 7010 may include a circular flexible display panel as shown in FIG. 7. In this case, therefore, visual information may be displayed on the entirety of the smart watch 7010.

In order to secure a user's field of vision sufficient to view the visual information displayed on the display unit of the smart watch 7010, the smart watch 7010 may move the visual information according to a tilt of the smart watch 7010. In other words, the visual information may float on the display unit according to the tilt of the smart watch 7010. In this embodiment, therefore, the smart watch 7010 may move the visual information such that the visual information is always displayed on the upper side of the smart watch 7010 according to the tilt of the smart watch 7010. For example, in a case in which the smart watch 7010 tilts outward, the smart watch 7910 may inwardly move the visual information being displayed (7020-1). On the other hand, in a case in which the smart watch 7010 tilts inward, the smart watch 7910 may outwardly move the visual information being displayed (7020-2).

In another embodiment, in order to secure a user's field of vision, the smart watch 7010 may determine an area in which the visual information is displayed according to a user gaze to the display unit (not shown). For example, the smart watch 7010 may detect a user gaze and may move the visual information to an area matched with the detected gaze.

Even in case of the smart watch 7010 in which the visual information floats as described above, the smart watch 7010 may execute a command according to a detected snap motion. Consequently, the embodiments previously described with reference to FIGS. 2 to 6 may be equally applied to the smart watch 7010 according to this embodiment. In this case, however, positions of the smart watch 7010 may be determined based on whether the visual information is located at the same plane as a back side of a hand of the user or a palm side of the hand of the user.

Figure 8:
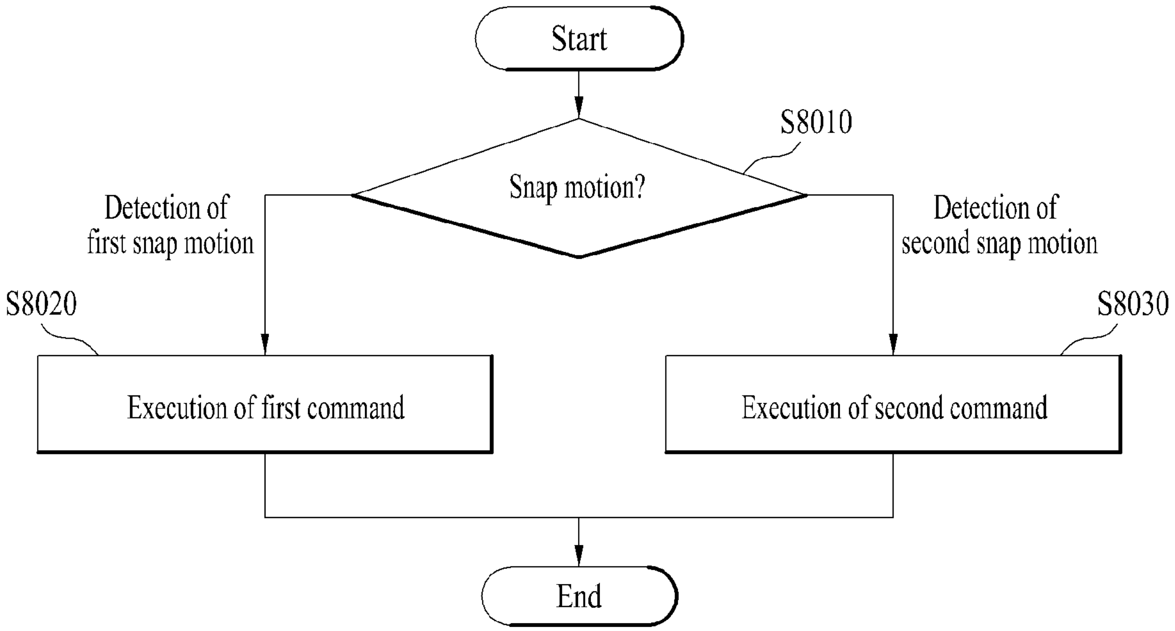
FIGS. 8 and 9 are flowcharts showing a method of controlling a smart watch according to one embodiment.

FIG. 8 is a flowchart showing a method of controlling a smart watch according to one embodiment. In the flowchart, a detailed description of parts similar to or duplicative with those previously described with reference to FIGS. 1 to 7 will be omitted.

First, the smart watch may detect a snap motion (S8010). The snap motion may include a first snap motion rotating on an axis of rotation of the smart watch in a first direction and a second snap motion rotating on the axis of rotation of the smart watch in a second direction. A method of detecting each snap motion will hereinafter be described in detail with reference to FIG. 9.

When detecting the first snap motion, the smart watch may execute a first command corresponding to the first direction (S8020). On the other hand, upon detecting the second snap motion, the smart watch may execute a second command corresponding to the second direction (S8030). The first command and the second command may correspond with each other. The first command and the second command may be determined based on kind of an application being currently executed or an execution screen of an application being currently displayed. Alternatively, the first command and the second command may be determined according to an event generated in the smart watch. Details thereof were previously described with reference to FIG. 4.

Figure 9:
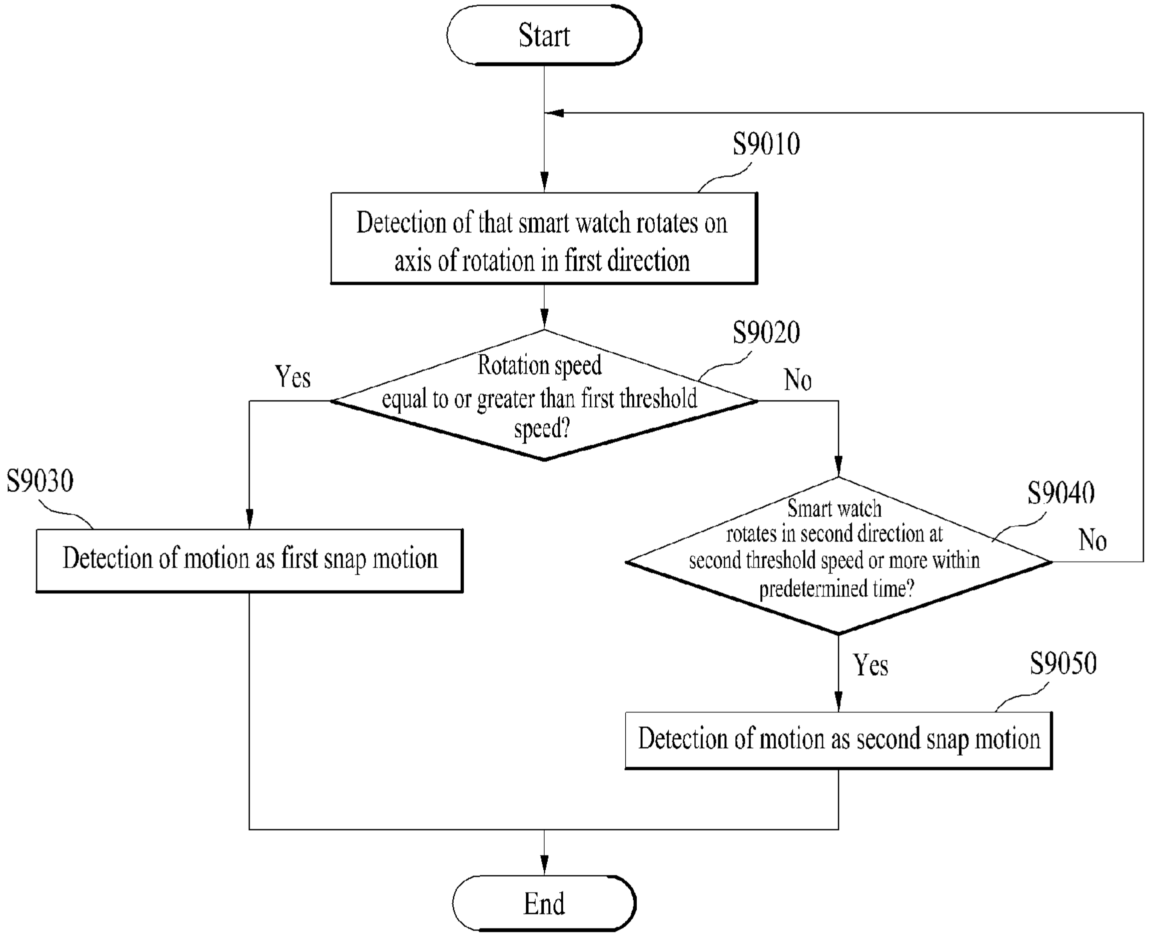

FIG. 9 is a flowchart showing a method of controlling a smart watch according to one embodiment. Specifically, FIG. 9 is a flowchart showing a method of detecting the first snap motion and the second snap motion previously described with reference to FIG. 8. In the flowchart, a detailed description of parts similar to or duplicative with those previously described with reference to FIGS. 1 to 8 will be omitted.

First, the smart watch may detect a rotation on an axis of rotation in a first direction (S9010). More specifically, the smart watch may detect the rotation in the first direction using a rotation sensor unit. In this case, the first direction may be a rotation direction in which a maximum rotation angle of a wrist is relatively large. For example, the first direction may be an outward direction.

Subsequently, the smart watch may detect whether a speed of the rotation in the first direction is equal to or greater than a first threshold speed (S9020).

When detecting that the speed of the rotation in the first direction is equal to or greater than the first threshold speed, the smart watch may detect the corresponding motion as a first snap motion (S9030). When detecting the first snap motion, the smart watch may execute a first command corresponding to the first direction.

On the other hand, when detecting that the speed of the rotation in the first direction is neither equal to nor greater than the first threshold speed, the smart watch may detect whether the smart watch rotates in the second direction at a second threshold speed or more within a predetermined time after rotation in the first direction (S9040). In other words, in a case in which the speed of the rotation in the first direction is less than the first threshold speed, the smart watch may detect whether the smart watch rotates in the second direction at the second threshold speed or more within the predetermined time after rotation in the first direction (S9040). At this time, the second direction may be a rotation direction in which the maximum rotation angle of the wrist is relatively small. Alternatively, the second direction may be a direction opposite to the first direction. For example, the second direction may be an inward direction. Meanwhile, the first threshold speed may be equal to or different from the first threshold speed.

When not detecting that the smart watch rotates in the second direction at the second threshold speed or more, the smart watch may return to the step S9010 of detecting the rotation in the first direction.

When detecting that the smart watch rotates in the second direction at the second threshold speed or more, the smart watch may detect the corresponding motion as a second snap motion (S9050). When detecting the second snap motion, the smart watch may execute a second command corresponding to the second direction.

Although not shown in the flowchart, the smart watch may further detect positions of the smart watch and/or tilts of the display unit to determine the first direction and the second direction. The smart watch may detect a first snap motion and a second snap motion according to the determined first direction and the determined second direction to execute a command corresponding to each snap motion, which was previously described with reference to FIGS. 3, 5, and 6.

In addition, although not shown in the flowchart, the smart watch may further set a third threshold speed in a case in which the second snap motion is detected. The third threshold speed is set to more accurately detect a snap motion of a user and to prevent malfunction of the smart watch. To this end, a step of detecting whether the speed of the rotation in the first direction is equal to or greater than the third threshold speed may be further provided between steps S9020 and S9040. Consequently, the smart watch may detect whether the smart watch has rotated in the first direction at less than the first threshold speed and at the third threshold speed or more to detect the second snap motion. Details thereof were previously described with reference to FIG. 4.

As is apparent from the above description, according to one embodiment, a smart watch may further detect positions of the smart watch and/or tilts of a display unit of the smart watch to determine a snap direction, based on which the smart watch detects a snap motion. Consequently, it is possible to prevent malfunction of the smart watch due to an unintentional wrist rotation of a user.

According to another embodiment, a smart watch may execute a command corresponding to a snap direction, thereby providing a method of more intuitively controlling the smart watch.

According to a further embodiment, a smart watch may determine a command according to an application being currently executed or displayed, thereby providing a method of more intuitively controlling the smart watch.

Although the respective drawings have been described for convenience of description, the embodiments described with reference to the respective drawings may be combined with one another to realize novel embodiments. In addition, a computer readable recording medium in which a program to execute the above-described embodiments is stored may be designed as needed within the scope of the disclosure.

In addition, the smart watch and the control method thereof are not limited to the configuration and method of the above-described embodiments, and all or some of the above-described embodiments may be selectively combined with one another to enable various modifications.

It will be apparent that, although the preferred embodiments have been shown and described above, the disclosure is not limited to the above-described specific embodiments, and various modifications and variations can be made by those skilled in the art without departing from the gist of the appended claims. Thus, it is intended that the modifications and variations should not be understood independently of the technical spirit or prospect of the disclosure.

Meanwhile, the control method of the smart watch of the disclosure may be realized as code, which is readable by a processor included in a network device, in recording media readable by the processor. The recording media readable by the processor includes all kinds of recording devices to store data which are readable by the processor. Examples of the recording media readable by the processor may include a read only memory (ROM), a random access memory (RAM), a magnetic tape, a floppy disk, and an optical data storage device. In addition, the recording media readable by the processor may also be realized in the form of a carrier wave, such as transmission through the Internet. Furthermore, the recording media readable by the processor may be distributed to computer systems connected to each other through a network such that code readable by the processor is stored or executed in a distribution mode.

In the disclosure, it will be understood that angles, speeds, and directions may represent accurate values and, in addition, may also represent substantial angles, speeds, and directions within a predetermined range. That is, the angles, speeds, and directions of the disclosure may represent substantial angles, speeds, and directions within a tolerance range.

In addition, the disclosure describes both a product invention as well as a method invention, and descriptions of both inventions may be complementarily applied as needed.

What is claimed is:

1. A smart watch comprising:

a rotation sensor unit configured to sense a rotation direction and a rotation speed of the smart watch;

a display unit configured to display visual information;

a position sensor unit configured to sense a position of the smart watch; and a processor configured to control the rotation sensor unit and the display unit, wherein the processor is further configured to:

detect whether the smart watch is in a first position or a second position using the position sensor unit, the first position being when the display unit is worn on a back side of a hand of a user, the second position being when the display unit is worn on a palm side of the hand of the user, wherein when the processor detects the first position, a first direction is an outward direction and a second direction is an inward direction, and wherein when the processor detects the second position, the first direction is an inward direction and the second direction is an outward direction, detect a first snap motion and a second snap motion of the smart watch in the detected first or second position, wherein the first snap motion is detected when the smart watch rotates on an axis of rotation of the smart watch in the first direction set according to the detected position of the smart watch, at a speed higher than a threshold speed, and wherein the second snap motion is detected, when the smart watch rotates on the axis of rotation in the first direction at a speed lower than the threshold speed and then rotates on the axis of rotation in the second direction set according to the detected position of the smart watch, at a speed higher than the threshold speed within a predetermined time, the second direction being an opposite direction of the first direction, and execute a first command corresponding to the first direction when the first snap motion is detected, and execute a second command corresponding to the second direction when the second snap motion is detected.

2. The smart watch according to claim 1, wherein the processor detects the second snap motion, when the smart watch in a start position rotates in the first direction at the speed lower than the threshold speed and then rotates back to the start position in the second direction at the speed higher than the threshold speed within the predetermined time.

3. The smart watch according to claim 1, wherein the rotations of the smart watch in the first and second directions occur once the smart watch is worn on a wrist of the user.

4. The smart watch according to claim 1, wherein, when the processor detects the first position, the processor is further configured to detect a tilt of the display unit, wherein the first direction is the outward direction and the second direction is the inward direction when the detected tilt is within a predetermined tilt range, or wherein the first direction is changed to be the inward direction and the second direction is changed to be the outward direction when the detected tilt is outside the predetermined tilt range.

5. The smart watch according to claim 1, wherein, when the processor detects the second position, the processor is further configured to detect a tilt of the display unit, wherein the first direction is the inward direction and the second direction is the outward direction when the detected tilt is within a predetermined tilt range, or wherein the first direction is changed to be the outward direction and the second direction is changed to be the inward direction when the detected tilt is outside the predetermined tilt range.

6. The smart watch according to claim 1, wherein the first command and the second command correspond with each other.

7. The smart watch according to claim 1, wherein each of the first command and the second command corresponds to at least one among an audio control command, a video control command, a scroll control command, an execution control command, an icon movement control command, and a zoom in and out control command.

8. The smart watch according to claim 1, wherein the processor is further configured to determine a type of the first or second command based on an application being currently executed or based on an execution screen of an application being currently displayed.

9. The smart watch according to claim 1, further comprising a communication unit configured to transmit and receive data to and from an external device.

10. The smart watch according to claim 9, wherein the processor is further configured to perform pairing with the external device using the communication unit and control the external device according to the first snap motion and the second snap motion.

11. The smart watch according to claim 1, wherein the processor is further configured to:

provide a notification regarding an event when the event is generated in the smart watch, and execute at least one of the first command and the second command corresponding to the notification when at least one of the first snap motion and the second snap motion is detected within a predetermined time after the notification has been provided.

12. The smart watch according to claim 1, wherein the display unit includes a flexible display panel.

13. The smart watch according to claim 12, wherein the processor is further configured to determine an area in which the visual information is displayed on the display unit according to a tilt of the smart watch.

14. A control method of a smart watch, the smart watch including a position sensor unit, a rotation sensor unit and a processor, the method comprising:

sensing, by the position sensor unit, a position of the smart watch;

detecting, by the processor using the position sensor unit, whether the smart watch is in a first position or a second position, the first position being when the display unit is worn on a back side of a hand of a user, the second position being when the display unit is worn on a palm side of the hand of the user, wherein when the processor detects the first position, a first direction is an outward direction and a second direction is an inward direction, and wherein when the processor detects the second position, the first direction is an inward direction and the second direction is an outward direction;

sensing, by the rotation sensor unit, a rotation direction and a rotation speed of the smart watch;

detecting, by the processor, a first snap motion and a second snap motion of the smart watch in the detected first or second position, wherein the first snap motion is detected when the smart watch rotates on an axis of rotation of the smart watch in the first direction set according to the detected position of the smart watch, at a speed higher than a threshold speed, and wherein the second snap motion is detected, when the smart watch rotates on the axis of rotation in the first direction at a speed less than the threshold speed and then rotates on the axis of rotation in the second direction set according to the detected position of the smart watch, at a speed higher than the threshold speed within a predetermined time, the second direction being an opposite direction of the first direction; and executing, by the processor, a first command corresponding to the first direction when the first snap motion is detected, and executing, by the processor, a second command corresponding to the second direction when the second snap motion is detected.

15. The method according to claim 14, wherein the detecting step detects the second snap motion, when the smart watch in a start position rotates in the first direction at the speed lower than the threshold speed and then rotates back to the start position in the second direction at the speed higher than the threshold speed within the predetermined time.

16. The method according to claim 14, wherein the rotations of the smart watch in the first and second directions occur once the smart watch is worn on a wrist of the user.

* * * * *